United States Patent [19]
Yamazaki et al.

[11] 3,962,355
[45] June 8, 1976

[54] METHOD OF PRODUCING DEHYDRATED FRIED SNACK FOOD FROM APPLES

[75] Inventors: Tatsuo Yamazaki, Matsudo; Takemi Hayashida, Hino, both of Japan

[73] Assignee: Kanro Co. Ltd., Tokyo, Japan

[22] Filed: Mar. 27, 1975

[21] Appl. No.: 562,586

[52] U.S. Cl............................ 426/639; 426/640; 426/660; 426/458
[51] Int. Cl.²........................ A23B 7/02; A23B 7/08
[58] Field of Search............ 426/438, 98, 102, 307, 426/615, 639, 640, 660, 458, 506, 281

[56] References Cited
UNITED STATES PATENTS

| | | | |
|---|---|---|---|
| 3,261,694 | 7/1966 | Forkner | 426/438 |
| 3,335,015 | 8/1967 | Forkner | 426/438 |
| 3,510,314 | 5/1970 | Lima et al. | 426/438 |
| 3,718,485 | 2/1973 | Lankford | 426/438 |

*Primary Examiner*—Curtis P. Ribando
*Attorney, Agent, or Firm*—Hans Berman; Kurt Kelman

[57] ABSTRACT

A method for producing a snack food from fruits and vegetables which comprises washing, paring and if necessary coring the fruit material or vegetable material and cutting it into pieces; if necessary inactivating oxidase contained therein by chemical treatment or heat treatment; frying the pieces in a vacuum or under atmospheric pressure; and cooling the fried pieces in a vacuum. The natural taste and tint of material is preserved, and the product of the method is agreeable to the palate.

6 Claims, No Drawings

METHOD OF PRODUCING DEHYDRATED FRIED SNACK FOOD FROM APPLES

This invention relates to a method for producing a snack food from fruits such as apples, or vegetables such as taros and potatoes. It is an object of the present invention not to impair the natural taste and color of the raw materials. In addition, unlike the conventional potato chips, the shape of the pieces of food prepared according to the present invention is not impaired. Still further, the food of the present invention is agreeable to the palate and well preserved, so that it is suitable as a snack.

In the method of the present invention, the raw materials (fruits such as apples or vegetables such as taros and potatoes) are washed, pared, and cut into pieces of suitable shape and thickness. If necessary, the pieces are treated to inactivate the oxidase contained therein, and are then fried at atmospheric pressure or in a vacuum. The fried pieces are expanded to restore their original size and shape and hardened in a cold vacuum. Thereby, a snack food which is porous and palatable, and has its natural tint, can be produced.

Fruits and vegetables containing much water and fibrous tissue can be easily dried. However, when dried by conventional methods, they become stiff and unpalatable and shrink. The dried and shrunken pieces can not be expanded by reduced pressure because their tissue is too hard. In accordance with the method of the present invention, this problem can be solved, and a novel and improved snack food may be produced.

In the following Examples, the method of the present invention will be explained in more detail with reference to specific fruits and vegetables.

EXAMPLE 1

Jonathan apples and Ralls Janet apples are subjected sequentially to washing, paring, coring, cutting, seasoning, drying, frying and vacuum swelling.

The apples are washed in a conventional manner and peeled. The cores of the peeled apples are removed and the flesh portions of the apples are cut into pieces of suitable shape and thickness. The thickness of the cut piece may be about 5 mm so as to prevent crumbling. In order to prevent browning caused by the oxidase contained in the apple pieces, they are treated with 2 to 3 % saline solution, and the prevention of browning can be enhanced by using vitamine C in said saline solution. Then, the pieces are soaked in sugar solution (sugar concentration: 30° to 40° syrup) at 65° to 90°C for about 15 to 20 minutes. This high temperature seasoning treatment is also effective for the inactivation of oxidase in the apples.

The seasoned pieces are laid on screens to drain excess sugar solution, and they are dried to 6 to 8 % moisture at about 70°C in a hot air drier. The proper selection of the drying temperature is important to keep browning to a minimum. The dried pieces are fried in a mixture of coconut oil and palm oil at 155° to 165°C under atmospheric pressure for 3 to 4 minutes.

While the fried pieces are still hot, they are placed in a cold vacuum chamber and restored to their original size and hardened within the chamber. The pressure in the chamber should be between 0 and 160 mm Hg to cause expansion of the pieces. When the pieces are expanded and cooled, they are removed from the chamber and residual oil is removed.

If the apple pieces are blanched in hot water at about 90°C for about 2 to 3 minutes before seasoning by the sugar solution, the sugar solution can be used at room temperature, but the treatment time is to be increased to about 30 minutes. Crumbling of the pieces and coloring of the sugar solution by conversion is prevented at the lower treating temperature, and the sugar solution can be used repeatedly. The apple pieces fried under atmospheric pressure must be placed in the vacuum chamber as quickly as possible. Therefore, the frying treatment may also be carried out in the vacuum according to the present invention. An oil vessel is placed in the vacuum chamber, and the dried pieces are fried at 120° to 130°C for 3 to 4 minutes. These conditions are mild as compared with frying under atmospheric pressure, and the consumption and degradation of the oil is reduced. In addition, the undesirable coloring of the apple pieces at the higher oil temperature is prevented. The fried pieces are withdrawn from the oil vessel and expanded and cooled within the vacuum chamber which must be provided with cooling means. The chamber pressure is preferably in the range from 0 to 160 mmHg.

When frying and expanding are carried out in the same vacuum chamber, the natural color of the apple pieces is maintained, and productivity is very much increased.

Alternatively, two vacuum chambers may be used and each chamber provided with an oil vessel. The two oil vessels are connected for transfer of the oil from one vessel to the other after frying, so that the temperature of the oil is not lowered much, and the operation can be carried out efficiently and economically.

EXAMPLE 2

Well-shaped taros are selected and washed, pared and cut into pieces of appropriate shape and thickness (preferably 2 to 3 mm). The pieces are soaked in a sugar solution of 20° to 30° at 65° to 90°C for 15 to 20 minutes, whereby the sugar permeates the pieces. The pieces are then laid on screen plates to drain excess sugar solution and fried. The procedures for frying and expanding the pieces in a vacuum chamber are the same as in the case of apples, so that a detailed explanation is omitted here. However, the taro pieces are fried without drying, and because of the high water content of the pieces, frying for 10 to 15 minutes is necessary.

The product obtained from taros has a porous texture like the product from apples, and is palatable, having the natural taste and flavor of the raw material. The coloring or yellowing by oil scorch is slight, so that the product has the natural tint of the raw material. It can be seasoned to give it a sweet taste, sour taste and oil taste.

What is claimed is:
1. A method of producing a food product which comprises:
   a. cutting apples into pieces;
   b. soaking said pieces in sugar syrup;
   c. draining excess syrup from said pieces;
   d. drying the drained pieces to a moisture content of 6 % to 8 % while in contact with hot air;
   e. frying the dried pieces at a reduced pressure of 0 to 160 mm Hg; and
   f. cooling the fried pieces at said pressure until they harden.

2. A method as set forth in claim 1 wherein said apples, prior to said cutting, are washed, peeled, and cored.

3. A method as set forth in claim 1, wherein said dried pieces are fried in oil for 3 to 4 minutes.

4. A method as set forth in claim 3, wherein the temperature of said oil is 120° to 165°C.

5. A method as set forth in claim 4, wherein said pieces contain oxidase, and said oxidase is inactivated prior to said frying.

6. A method as set forth in claim 5, wherein said oxidase is inactivated by heat treatment.

* * * * *